(12) United States Patent
Piascik et al.

(10) Patent No.: US 6,291,089 B1
(45) Date of Patent: Sep. 18, 2001

(54) RADIAL PLANAR FUEL CELL STACK CONSTRUCTION FOR SOLID ELECTROLYTES

(75) Inventors: James Piascik, Randolph; Daniel Dalfonzo, South Plainfield; Jean Yamanis, Morristown; Liang A. Xue, Randolph, all of NJ (US); Gregory Lear, Redondo Beach, CA (US); James Powers, Raritan, NJ (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/427,436

(22) Filed: Oct. 26, 1999

(51) Int. Cl.⁷ .................................................... H01M 8/04
(52) U.S. Cl. .............................. 429/17; 429/12; 429/14; 429/32; 429/39
(58) Field of Search .................................. 429/12, 14, 32, 429/39

(56) References Cited

U.S. PATENT DOCUMENTS

| | | |
|---|---|---|
| 4,490,445 | 12/1984 | Hsu . |
| 4,770,955 | 9/1988 | Ruhl . |
| 4,910,100 | 3/1990 | Nakanishi et al. . |
| 5,252,410 | 10/1993 | Wilkinson et al. . |
| 5,342,706 | 8/1994 | Marianowski et al. . |
| 5,399,442 | 3/1995 | Shundo . |
| 5,527,634 | 6/1996 | Meacham . |
| 5,549,983 | * 8/1996 | Yamanis ................................. 429/32 |
| 5,554,454 | 9/1996 | Gardner et al. . |
| 5,589,285 | 12/1996 | Cable et al. . |
| 5,691,075 | 11/1997 | Batawi .................................. 429/32 |
| 5,763,114 | 6/1998 | Khandkar et al. . |
| 5,851,689 | 12/1998 | Chen . |
| 5,922,485 | * 7/1999 | Enami ................................... 429/30 |
| 6,045,935 | * 4/2000 | Ketcham et al. .................... 429/30 |

FOREIGN PATENT DOCUMENTS

| | | |
|---|---|---|
| 0 722 193 A1 | 7/1996 | (EP) . |
| WO 99/44254 | 9/1999 | (WO) . |

OTHER PUBLICATIONS

Patent Abstracts of Japan, Disk–Stacked Solid Electrolyte Fuel Cell, Dec. 18, 1990, Publication No. JP 02 304870, vol. No. 015, No. 090.

* cited by examiner

*Primary Examiner*—Gabrielle Brouillette
*Assistant Examiner*—Dah-Wei D. Yuan
(74) *Attorney, Agent, or Firm*—William J. Zak, Jr. Esq.

(57) ABSTRACT

A radial planar fuel cell stack comprises an internal manifold having a first interior cavity and a second interior cavity. A plurality of single cells having an anode layer, a cathode layer, and an electrolyte layer therebetween are disposed about the manifold. A manifold bracket operatively fixes the manifold to at least one of the single cells. The manifold bracket describes a channel in communication with at least one of the first and second interior cavities. A porous element is disposed in the channel and ensures uniform distribution of gases over 360°.

27 Claims, 6 Drawing Sheets

RADIAL PLANAR FUEL CELL STACK CONSTRUCTION FOR SOLID ELECTROLYTES

BACKGROUND OF THE INVENTION

This invention generally relates to the construction of fuel cell stacks and, more particularly, to the construction of fuel cells, such as oxygen-ion conducting solid oxide fuel cells and proton conducting ceramic or polymer membrane fuel cells, in which the electrolyte is a solid.

A fuel cell is basically a galvanic conversion device that electrochemically reacts a fuel with an oxidant to generate a direct current. A fuel cell typically includes a cathode material, an electrolyte material, and an anode material. The electrolyte is a non-porous material sandwiched between the cathode and anode materials. An individual electrochemical cell usually generates a relatively small voltage. Thus, to achieve higher voltages that are practically useful, the individual electrochemical cells are connected together in series to form a stack. Electrical connection between cells is achieved by the use of an electrical interconnect between the cathode and anode of adjacent cells. The electrical interconnect also provides for passageways which allow oxidant fluid to flow past the cathode and fuel fluid to flow past the anode, while keeping these fluids separated. Also typically included in the stack are ducts or manifolding to conduct the fuel and oxidant into and out of the stack.

The fuel and oxidant fluids are typically gases and are continuously passed through separate passageways. Electrochemical conversion occurs at or near the three-phase boundaries of each electrode (cathode and anode) and the electrolyte. The fuel is electrochemically reacted with the oxidant to produce a DC electrical output. The anode or fuel electrode enhances the rate at which electrochemical reactions occur on the fuel side. The cathode or oxidant electrode functions similarly on the oxidant side.

Fuel cells with solid electrolytes are the most promising technologies for power generation. Solid electrolytes are either ion conducting ceramic or polymer membranes. In the former instance, the electrolyte is typically made of a ceramic, such as dense yttria-stabilized zirconia (YSZ) ceramic, that is a nonconductor of electrons, which ensures that the electrons must pass through the external circuit to do useful work. With such an electrolyte, the anode is oftentimes made of nickel/YSZ cermet and the cathode is oftentimes made of doped lanthanum manganite.

Perhaps the most advanced construction with ceramic membranes is the tubular solid oxide fuel cell based on zirconia. The tubular construction can be assembled into relatively large units without seals and this is its biggest engineering advantage. However, tubular solid oxide fuel cells are fabricated by electrochemical vapor deposition processes, which are slow and costly. The tubular geometry of these fuel cells also limits the specific power density, both on weight and volume bases, to low values. The electron conduction paths are also long and lead to high energy losses due to internal resistance heating. For these reasons, other constructions are actively being pursued.

The common alternative construction to the tubular construction is a planar construction that resembles a cross-flow heat exchanger in a cubic configuration. The planar cross flow fuel cell is built from alternating flat single cell membranes (which are trilayer anode/electrolyte/cathode structures) and bipolar plates (which conduct current from cell to cell and provide channels for gas flow into a cubic structure or stack). The bipolar plates are oftentimes made of suitable metallic materials. The cross-flow stack is manifolded externally on four faces for fuel and oxidant gas management.

The cross-flow or cubic design, however, requires extensive sealing, both in terms of the number of seal interfaces and the linear size of such interfaces. The latter increases with the stack footprint and leads to serious problems if the metal and ceramic cell parts do not have closely matched thermal expansion coefficients. A significant mismatch in the thermal expansion coefficients leads to thermal stresses that can cause catastrophic failure on cool down from the stack operating temperature.

Additional disadvantages of the cross-flow design include the skewed density distribution and, thereby, skewed temperature distribution that is imposed by the flow field. Also, the cross-flow design has stress concentrations at the corners that can have damaging effects. From a cost-effective manufacturing view, manifolding the cubic device in a co-flow configuration is virtually impossible due to the extremely short height of the gas channels.

An alternative to the cross-flow or cubic design has been a radial or co-flow design. For example, U.S. Pat. No. 4,770,955 discloses an annular shaped anode, cathode, and electrolyte sandwiched therebetween. Annular shaped separator plates sandwich the combination of anode, cathode, and electrolyte. The above components each describe two holes and, consequently, two tubes. One tube provides a fuel flow while the other tube provides an oxidant flow. The cathode is protected from direct fuel contact in one tube by a tubular gasket that forms a seal with one separator and electrolyte. The anode is protected from direct oxidant contact in the other tube by another tubular gasket that forms a seal with the other separator and electrolyte. Yet, the design appears to inherently lack good flow control because it is based on the porosity of the electrode and radial length of the porous electrode from the tube. Also, the non-symmetrical position of the tubes results in differing flow path lengths as a function of the central angle with the tube as the center and, thus, non-uniform flow distribution. U.S. Pat. No. 5,589,285 is similar to the foregoing.

In another example of a radial fuel stack design, U.S. Pat. No. 4,490,445 provides alternating circular cells and conductor plates. The cells and plates are provided with holes along their peripheries to create fuel and oxidant inlets and outlets. The conductor plates are provided with circumferential ridges along the edges to provide seals with the cells. The conductor plates also have grooves on opposing faces that provide flow both radially and circumferentially, although primarily the latter. With the potential flow paths being somewhat random, non-uniform flow distribution can be expected.

U.S. Pat. No. 4,910,100 discloses various embodiments of a radial fuel cell stack design that include fuel and oxidant channels in the central area of the stack. Gas holes in the fuel and oxidant channels supply flows across the opposing faces of annular shaped separator plates that are alternately disposed with annular shaped single cells. Guide vanes on the opposing faces of the separator plates direct fuel and oxidant flow from a central area of the stack and towards the peripheral area. It is claimed that the plates and cells may be stacked without gas seals. However, some of the disadvantages to this design include the non-uniform distribution of oxidant and fuel gases due to the use of two internal manifold tubes and the heavy, all-ceramic construction of individual parts.

More recently, in U.S. Pat. No. 5,549,983, a co-flow planar fuel cell stack for solid electrolytes includes an internal manifold having fuel and oxidant cavities. Tubular porous elements surround the manifold for controlling radial fuel and oxidant flows. The tubular porous elements may also be called flow distributor elements or simply flow distributors. Annular, planar cells of anode/electrolyte/cathode are disposed about the porous elements. An annular separator plate is sandwiched between each single cell and each current conductor element. The single cells and separator plates extend at their inner diameters to the inner manifold. Accordingly, a sealant is required to seal the separator plates and single cells to the manifold and porous elements. Notwithstanding its advantages, the design includes a significant number of interfaces to be sealed. Having the individual cells sealed to the porous elements provides the potential for cracking due to sources such as bending stresses and pressure differentials.

Other examples of radial-type fuel stack designs are found in U.S. Pat. Nos. 5,851,689; 5,527,634; and 5,399,442.

As can be seen, there is a need for an improved fuel stack design for solid electrolytes. In particular, there is a need for a radial flow fuel cell stack that minimizes the required sealing in terms of the number of interfaces to be sealed and the length of the interfaces. Also needed is a fuel cell stack that provides a more uniform flow field and, thereby, more uniform current density and temperature distributions. Another need includes ease of manifolding for co-flow and stack arrays in fuel cells having solid electrolytes. A fuel cell stack design is needed that also eliminates 90° corners where damaging stress concentrations can arise.

SUMMARY OF THE INVENTION

Accordingly, an object of the present invention is to provide a fuel cell stack for solid electrolytes that utilizes radial flow.

Another object of the present invention is to provide a fuel cell stack that minimizes the required sealing in terms of the number of interfaces to be sealed and the length of the interfaces.

Yet another object of the present invention is to provide a more uniform flow field in a fuel cell stack and, thereby, more uniform current density and temperature distributions.

An additional object of the present invention is to provide ease of manifolding for co-flow and stack arrays in fuel cells having solid electrolytes.

A further object of the present invention is to provide a fuel cell stack that eliminates 90° corners where damaging stress concentrations can arise.

A still further object of the present invention is to allow freedom of motion to the single cells, interconnect assemblies, and end plates of a fuel cell stack, thereby allowing them to conform to each other.

Also, an object of the present invention is to allow prefabrication and testing of a manifold to a radial planar fuel cell stack.

The present invention achieves the foregoing objects, as well as others, by a fuel cell stack comprising an internal manifold having a first interior cavity and a second interior cavity; a plurality of single cells having an anode layer, a cathode layer, and an electrolyte layer therebetween, with the single cells being disposed about the internal manifold; a manifold bracket that operatively fixes the manifold to at least one of the single cells, with the manifold bracket describing a channel in communication with at least one of the first and second interior cavities; and a porous element disposed in the channel.

These and other features, aspects and advantages of the present invention will become better understood with reference to the following drawings, description and claims.

DETAILED DESCRIPTION OF THE INVENTION

Figure 1:
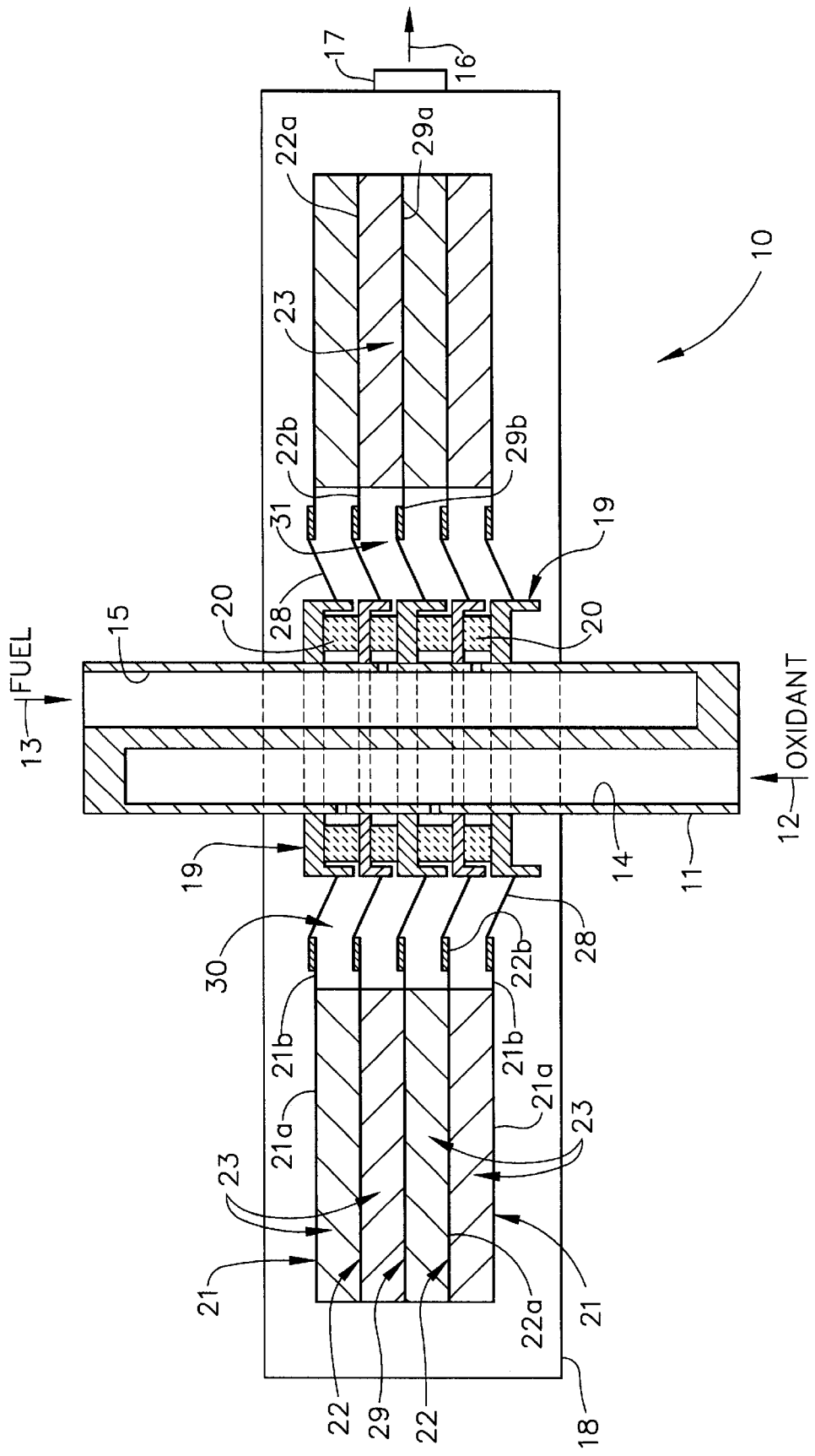
FIG. 1 is a diagram of a side view of a fuel cell stack according to an embodiment of the present invention.

In FIG. 1, a planar fuel cell stack 10 according to one embodiment of the present invention is shown. The fuel cell stack 10 is generally applicable for the use of solid electrolytes. Accordingly, the present invention contemplates that the fuel cell stack 10 can be used in the context of at least solid oxide fuel cells and proton exchange membrane fuel cells well known in the art. Further, while the fuel cell stack 10 and its components are described in a preferred embodiment as being circular in overall configuration, the present invention contemplates that other configurations for the overall stack 10 and its individual components can be utilized, such as polygonal.

The fuel cell stack 10, in this embodiment, has an overall circular configuration. Accordingly, from a top cross sectional view (not shown), the various components of the fuel cell stack 10 described below have a circular cross section. The fuel cell stack 10 includes an internal manifold 11 that flows gases 12, 13 into stack 10. Although various materials can be used to construct the manifold 11, preferred materials include ceramics, glass-ceramics, metallic alloys, oxidation resistant metallic alloys, metal-ceramic composites and intermetallics. The preferred external geometrical shape of the internal manifold 11 is a right cylinder but other shapes could obviously be used.

The internal manifold 11 is preferably positioned in a central area or center point of the stack 10. When viewed from FIG. 1, the manifold 11 extends from a first or topside of the stack 10, through the stack 10, and out of a second or bottom side of the stack 10. Formed within the internal manifold 11 is a first interior cavity 14 and a second interior cavity 15 that extend along the longitudinal length of the manifold 11. Both cavities 14, 15 flow the gases 12, 13 into the manifold 11. In this embodiment, the first internal cavity 14 flows the oxidant gas 12, while the second interior cavity 15 flows the fuel gas 13. Nevertheless, it can be appreciated that either cavity 14, 15 can flow either gas 12, 13 depending upon the orientation of single cells 22 described below.

Figure 2:
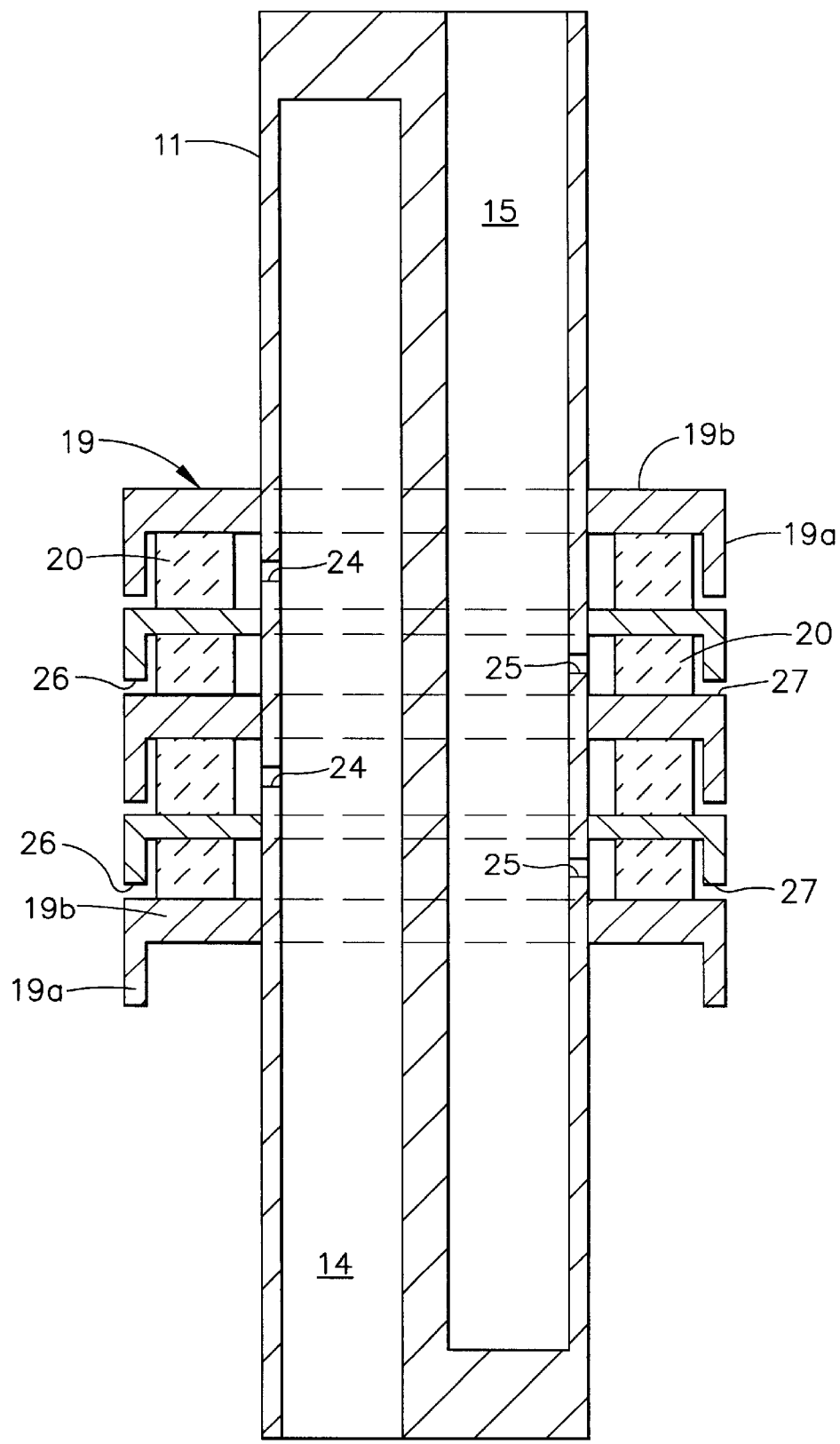
FIG. 2 is a diagram of a side view of a portion of the fuel cell stack shown in FIG. 1.

As best seen in FIG. 2, the internal manifold 11 describes a plurality of first openings 24 and second openings 25. The openings 24, 25 provide a means for the gases 12, 13 to flow out of the interior cavities 14, 15. In this embodiment, the first openings 24 allow the oxidant 12 to flow out of the first cavity 14, while the second openings 25 allow the fuel 13 to flow out of the second cavity 15. The openings 24 are properly sized to enable the uniform distribution of oxidant gas 12 to each and every cell 22 in the stack 10. Similarly the openings 25 are properly sized to enable the uniform distribution of fuel gas 13 to each and every cell 22 in the stack 10.

A plurality of annular manifold brackets 19 is fixed about the exterior of the interior manifold 11. Preferably, the brackets 19 are brazed to the interior manifold 11, but other means can be used. In FIG. 2, immediately adjacent brackets 19 form therebetween a plurality of first and second channels 26, 27 that lead respectively from the first and second openings in the manifold 11. The brackets 19 are each cylindrically shaped (minus one end) in this embodiment, with the side wall oriented downwards when viewed from FIG. 2. However, other configurations and orientations may be useful and each of the brackets 19 need not be of the same configuration and orientation. Also, while the present embodiment includes five brackets 19, the number of brackets 19 may vary depending upon the number of single cells 22 in the stack 10, as further described below. The brackets 19 are preferably made of the same material or closely similar material as that used for the manifold 11 in order to eliminate the possibility of galvanic corrosion and potentially damaging thermal stresses arising from mismatch of thermal expansion coefficients. If the internal manifold 11 and the manifold brackets 19 are made of electrically conducting materials, the manifold brackets 19 should preferably have an electrically insulating layer, or coating, on its exterior surface.

An annular and planar porous element 20 is positioned between each pair of adjoining manifold brackets 19 and within the first and second channels 26, 27. The porous elements 20 serve to uniformly distribute oxidant 12 or fuel 13 gases to the cells 22 over 360° and can be made of materials such as metallic alloys, intermetallics, metal-ceramic composites, ceramics, and glass-ceramics.

Figure 3:
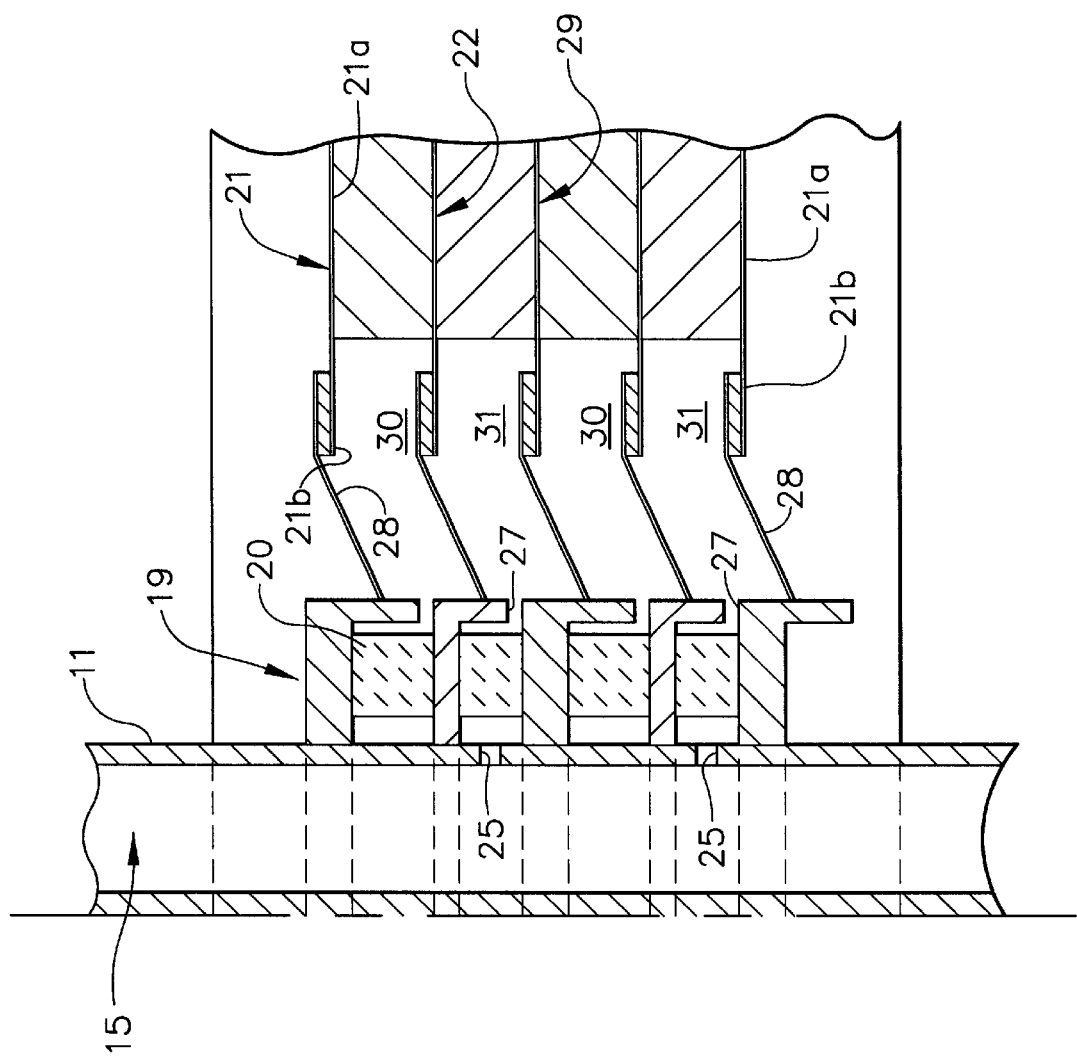
FIG. 3 is a diagram of a side view of another portion of the fuel cell stack shown in FIG. 1.

Each of the manifold brackets 19 mates at its outer periphery with an annular seal bracket 28. In referring to FIGS. 2 and 3, it can be seen that immediately adjacent seal brackets 28 form a plurality of first and second passageways 30, 31 that respectively extend from the first and second channels 26, 27. In this embodiment, the seal brackets 28 have two planar surfaces juxtaposed at an obtuse angle. The inner peripheral area of each seal bracket 28 is sealed (such as by a sealant made of glass or glass-ceramics) to the outer periphery of a manifold bracket 19. The outer peripheral area of each seal bracket 28 is sealed to an inner periphery of either an end plate 21, a single cell 22, or a separator plate 29, all of which are described below.

The end or current collector plate 21, single cell 22, and separator plate 29 are constructed and serve functions according to that well known in the art. For the embodiment shown in FIG. 1, an end plate 21 is disposed at the top and bottom of the fuel cell stack 10. The end plates 21 sandwich therebetween a sequence (starting from top to bottom) of an interconnect 23, single cell 22, interconnect 23, separator plate 29, interconnect 23, single cell 22, and interconnect 23. However, it should be understood that the foregoing sequence can be extended to incorporate additional single cells 22, or even be shortened to delete a single cell 22. In such event, the number of interconnects 23 and separator plates 29 will accordingly change.

Both annular and planar end plates 21 serve to collect current generated by the single cells 22 and can be constructed of electrically conducting materials such as metals, oxidation resistant alloys, stainless steel, or superalloys. Each of the end plates 21 include a primary portion 21a and an extended portion 21b, with the extended portions 21b being closest to the internal manifold 11. The extended portions 21b overlap with and are sealed to portions of the seal brackets 28 that are furthest away from the manifold 11.

The interconnects or current conductor elements 23 are also annular in configuration and fixed to their immediately adjacent components of end plates 21 or separator plates 29 by such means as brazing or bonding. The interconnects 23 are preferably made of an electronic conductor element for carrying current from one single cell 22 to the next. Suitable materials for the interconnects 23 include metallic alloys, intermetallics, metal-ceramic composites, and electron conducting ceramics. The interconnects 23 preferably have a skeletal structure so that they allow unimpeded flow of oxidant 12 and fuel 13, as described hereinafter. The material comprising the interconnects 23 should be distributed uniformly in all directions in the space between each single cell 22 and separator plate 29 (or end plate 21) so as to facilitate the radial flow of fuel 13 and oxidant 12 gases.

The outer peripheries of the interconnects 23 extend substantially to the outer peripheries of the end plates 21 (or separator plate 29). The inner peripheries of the interconnects 23 extend substantially to where the primary portions 21a and extended portions 21b of the end plates 21 meet one another. One set of interconnects 23 are in flow communication with the first passageways 30 and, thereby, the oxidant 12. Another set of interconnects 23 are in flow communication with the second passageways 31 and, thereby, the fuel 13. This enables the interconnects 23 to channel the oxidant 12 across a cathode side of the single cells 22 and the fuel 13 across an anode side of the single cells 22.

The interconnect and separator plates 23, 29 are made of metal foils, i.e., thin metal sheets, so as to lead to lightweight stacks. Yet, these components need to have sufficient thickness to provide the desired lifetime for the stack 10. The metal foils can be formed into a variety of geometrical shapes which provide for uniform fluid flow in the radial direction and sufficient electrical current conduction capacity in the longitudinal direction. One preferred example of an interconnect 23 structure is thin metal foils formed into off-set fin shapes and sliced and arranged so as to facilitate the radial flow direction of the oxidant and fuel gases 12, 13. Another example of a preferred interconnect 23 structure is thin metal plates of very high porosity, i.e., porosity in excess of 90% by volume, such as nickel foam which can be used as the interconnect 23 on the anode side of the cell 22.

The materials used for the internal manifold 11, the manifold bracket 19, the porous element 20, the seal bracket 28, the end plate 21, the separator plate 29 and the interconnect 23 should be selected so as to have thermal expansion behavior similar to the cell 22 material so that thermal stresses do not develop during thermal cycling from ambient to the operating temperature and back. In the case of interconnect 23, some thermal expansion mismatch can be accommodated by incorporating compliance aspects in this part either by geometrical design or by proper selection of the material. Nickel foam, for example, is inherently a compliant material and its thermal expansion mismatch with the cell 22 does not lead to damaging thermal stresses.

As mentioned above, the single cells 22 have an anode side and a cathode side. These two sides are provided by the well known tri-layer construction of anode-electrolyte-cathode. The anode layer in the cell 22 can be made of nickel/YSZ cermet; the electrolyte layer can be made of yttria-stabilized zirconia (YSZ); and the cathode layer can be made of strontium-doped lanthanum manganite. As with the end plates 21, each of the single cells 22 preferably include a primary portion 22a and an extended portion 22b that are respectively aligned with the primary portions 21a and the extended portions 21b of the end plates 21. Similarly, the extended portions 22b overlap with and are sealed to the outer peripheral areas of the seal brackets 28.

The separator plate 29 that is disposed between two interconnects 23 is annular and planar in configuration for this embodiment. The separator plate 29 serves to separate the flows of oxidant 12 and fuel 13 as they pass through the interconnects 23. The separator plate 29 must be made of an electronic conductor material to also carry the current generated from one single cell 22 to the next. Thus, the separator plate 29 may be made from metallic alloys, intermetallics, metal-ceramic composites, and electronic conducting ceramics. It too has a primary portion 29a and an extended portion 29b that are respectively aligned with the other primary portions 21a, 22a, and the extended portions 21b, 22b. Also, the extended portion 29b of the separator plate 29 overlaps with and is sealed to an inner portion of a seal bracket 28.

During operation of the fuel cell stack 10, the oxidant 12 is flowed into the first interior cavity 14 of the manifold 11 while the fuel 13 is flowed into the second interior cavity 15. The oxidant 12 flows out of the first cavity 14 through the first openings 24, into the first channels 26, and out through the first passageways 30. Likewise, the fuel 13 flows out of the second cavity 15 through the second openings 25, into the second channels 27, and out through the second passageways 31. The oxidant 12 then moves through one set of interconnects 23 and across the cathode side of the single cells 22 in a substantially uniform radial flow. The fuel 13 moves through another set of interconnects 23 and across the anode side of the single cells 22 also in a substantially uniform radial flow. The electrochemical reactions produced by the cells 22 produce a current that is carried through the stack 10 to an end plate 21. Spent fuel and oxidant is exhausted out of a housing 18 of the fuel stack 10 and through an outlet port 17.

EXAMPLE 1

Stack Fabrication and Assembly

A complete, internally-manifolded radial stack according to the present invention but comprising only one cell was fabricated in several steps.

The first step involved fabrication of the composite manifold subassembly by brazing together one manifold 11, two porous elements 20, and three manifold brackets 19. The manifold 11 had previously been subjected to machining operations to form an interior cavity 14 for oxidant gas 12 and an interior cavity 15 for fuel gas 13. The interior cavity 14 had one opening 24, and interior cavity 15 had one opening 25.

The second step involved fabrication of two metallic interconnect end plates by brazing. Each interconnect end plate comprised an interconnect 23 which was made of metal foil formed into an off-set fin structure and cut into segments having a circular sector geometry, a seal bracket 28, and an end plate 21. The third step involved fabrication of a cell assembly by bonding a seal bracket 28 to the electrolyte layer of a cell 22 by means of a glass-based sealant material.

The cell 22 had previously been formed from a ceramic bilayer comprising a layer of yttria-stabilized zirconia, the so-called electrolyte layer, and a second layer of yttria-stabilized zirconia mixed with nickel oxide, the so-called anode layer, by depositing and firing a strontium-doped lanthanum manganite layer, the so-called cathode layer, onto the electrolyte layer. The ceramic bilayer was formed in the green state by calendering anode and electrolyte layer tapes together. The electrolyte layer in this fired ceramic bilayer had a thickness of about 5 to 10 micrometers.

For assembling the one-cell stack, the composite manifold subassembly was secured in a fixture that placed it at the center of a suitably designed stack stand and ensured vertical alignment. The fixture was equipped with a micrometer mechanism that allowed controllable vertical movement to the composite manifold. After securing the composite manifold, the bottom interconnect end plate subassembly was placed on the stand and the composite manifold was raised up or lowered down to properly align the open end of the seal bracket of the bottom interconnect end plate to the bottom manifold bracket of the composite manifold. After completion of this seal bracket to manifold bracket alignment, a bead of glass-based sealant was placed at the interface of the seal and manifold brackets to prevent escape of fuel gas. The cell was then positioned onto the bottom interconnect end plate, the cell's anode layer facing down, and a bead of sealant was placed at the interface of the cell's seal bracket to the next manifold bracket of the composite manifold. Next, the top interconnect end plate was placed onto the cell and a bead of sealant was placed at the interface of the seal bracket of the top interconnect end plate to the next manifold bracket of the composite manifold. The assembly of interconnect, end plates and cell, the so-called stack, was then constrained in movement relative to the composite manifold by plates that were suitably anchored to the manifold for handling in the green state. During firing and testing, the stack was placed under a light uniform, compressive stress by the use of annular weights.

Stack Installation and Firing

The assembled stack was placed in an electrically-heated furnace at ambient temperature. The lower end of the stack manifold 11 was connected to air supply source by means of flexible stainless steel tubing and Swagelok® fittings. The upper end of the manifold was connected to a hydrogen supply source by means of flexible stainless steel tubing and Swagelok® fittings. A bundle of platinum wires were spot-welded to two-diametrically opposed spots at the periphery of the bottom end plate, the negative stack pole, of the stack and to one end of welding copper cable outside the furnace. A similar electric connection was made for the top end plate, the positive stack pole, of the stack. During stack testing, the other ends of the welding copper cables were connected to the negative and positive terminals of an electronic load, respectively.

Single platinum wires were also spot welded to the periphery of the stack end plates for monitoring the voltage across the stack during operation. A set of six thermocouples having ungrounded junctions and Inconel sheaths were placed into the interconnect void space on the cathode side in a radial direction, approximately one inch from the end of the interconnect and at approximately 60° apart.

The stack was tested for electrical shorting after all the aforementioned connections were made. In the absence of electrical shorting, the furnace was closed and the temperature of the furnace and, therefore, the stack was ramped to the desired level for bonding of the interconnects to the cell electrodes. Subsequently, the furnace temperature was brought to the stack operating temperature as desired.

Anode Reduction and Stack Testing

After the stack was brought to the desired operating temperature, helium gas was fed to the anode side and air flow was established on the cathode side. Hydrogen gas, the fuel, was programmed to replace the helium gas on the anode side linearly over a period of 3 hours. The introduction of hydrogen into the helium gas stream reduces the dispersed nickel oxide component of the anode to nickel metal. The reduction of the nickel oxide to nickel is accompanied by the development of voltage across the cell. At the completion of reduction and at 800° C., the open circuit voltage (OCV) of this one-cell radial stack, Stack 10, was 1.082 V at hydrogen and air flow rates of 1 and 2.4 standard liters per minute (slpm), respectively.

Figure 4:
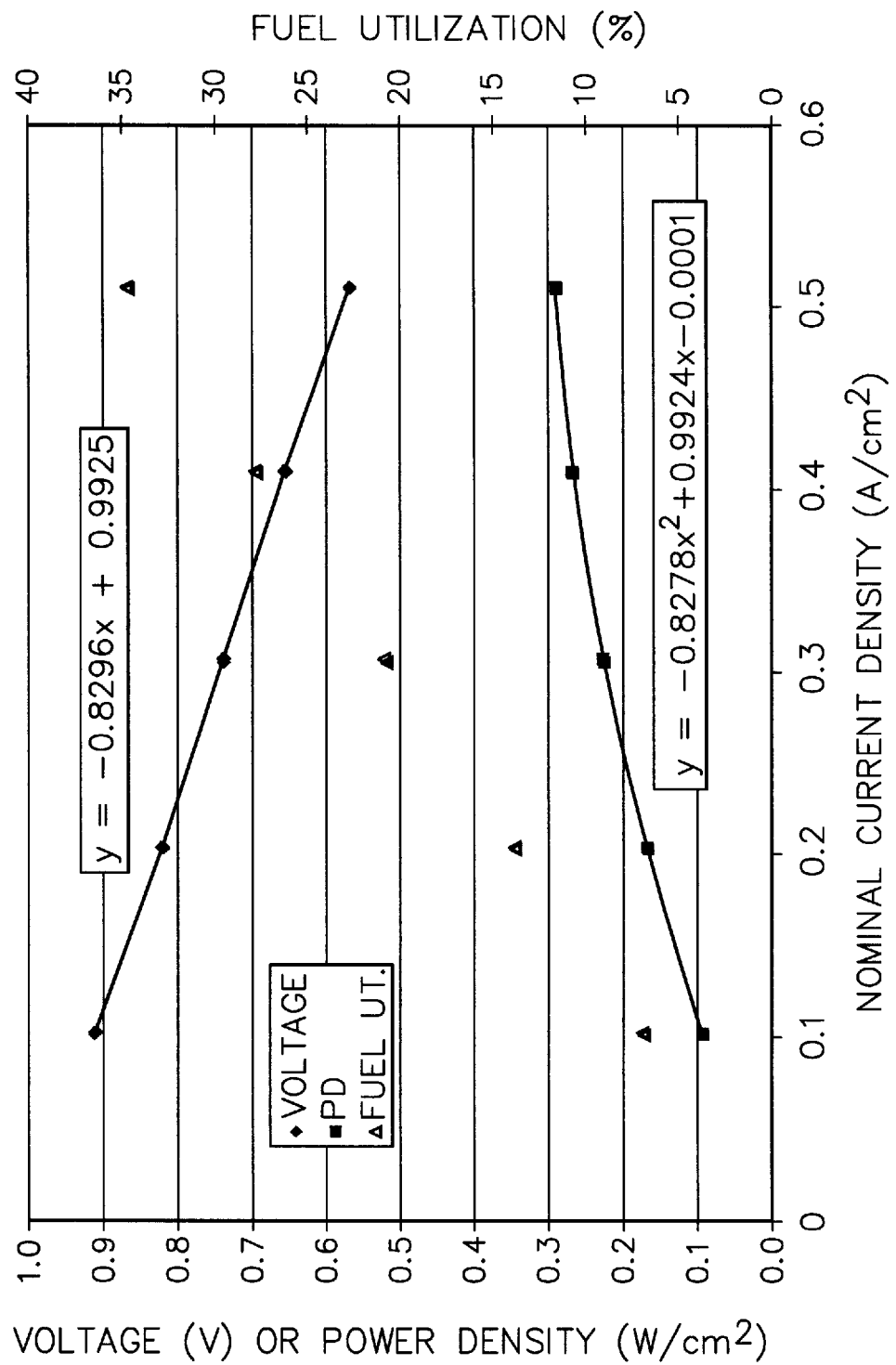
FIG. 4 is a graph which shows the polarization behavior of a fuel cell stack according to an embodiment of the present invention as plots of voltage, power density and fuel utilization versus current density.

After the anode reduction, Stack 10 was placed under successively higher current loads and its voltage response, along with the corresponding power density (PD) and fuel utilization at start up is shown in FIG. 4. The continuous lines in the graph represent the regression fit to the experimental data. An estimate of the area specific resistance of the stack is given by the slope of the least squares line and is equal to 0.8296 $\Omega \cdot cm^2$. The maximum power density for the stack of this example can be estimated from the regression equation for the power density and is 297 $mW/cm^2$.

Figure 5:
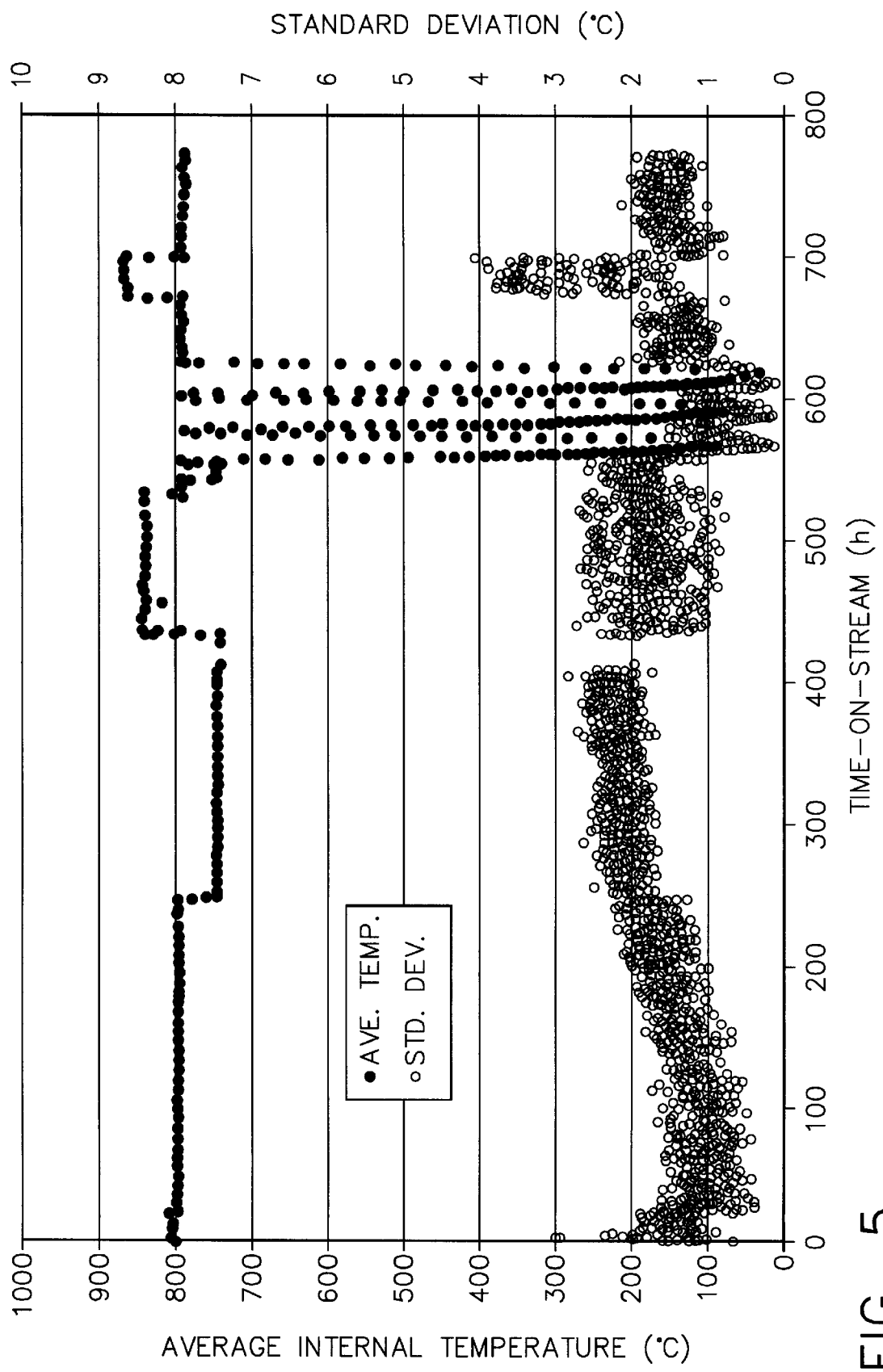
FIG. 5 is a graph which shows the average of six internal temperatures and the a plot of the standard deviation between these six temperatures as a function of time for a fuel cell stack according to the embodiment of the present invention used in connection with FIG. 4.

Stack 10 was operated under a series of current loads and temperatures for about 800 hours. The stack was also subjected to three thermal cycles from 800° C. to about 50° C. and back after about 560 hours on-stream. Under all these conditions, the six internal temperatures measured by the thermocouples were very close to each other and close to the furnace temperature. The uniformity of these six temperatures is attested by the graphed data in FIG. 5, which shows a plot of the average temperature, i.e., the average of the six internal thermocouple readings, and a plot of the standard deviation between these six readings. The maximum value of the standard deviation is about 4° C. at the stack average temperature of about 860° C.

The uniformity of these six temperatures is strong indirect evidence that the glass based seals at the three seal bracket to manifold bracket interfaces and especially the middle manifold bracket were good and prevented the cross-leakage of fuel and air gas streams. For if there were cross-leakage of fuel and air streams, there would have been hydrogen combustion and the exothermicity of the combustion reaction would have raised the temperature of the gas stream.

Moreover, the uniformity of the internal temperatures through the three thermal cycles provides strong evidence that the selected materials of construction are well matched with respect to thermal expansion and do not give rise to thermal stresses that would damage the stack.

EXAMPLE 2

A 3-cell stack, Stack 12, was assembled from parts fabricated as described in Example 1. Similarly, the installation in the furnace, the firing and the anode reduction were accomplished as described in Example 1. The open circuit voltage of Stack 12 immediately after reduction was 3.044 V under hydrogen and air flow rates of 0.65 and 2.4 sipm/per cell, respectively.

Figure 6:
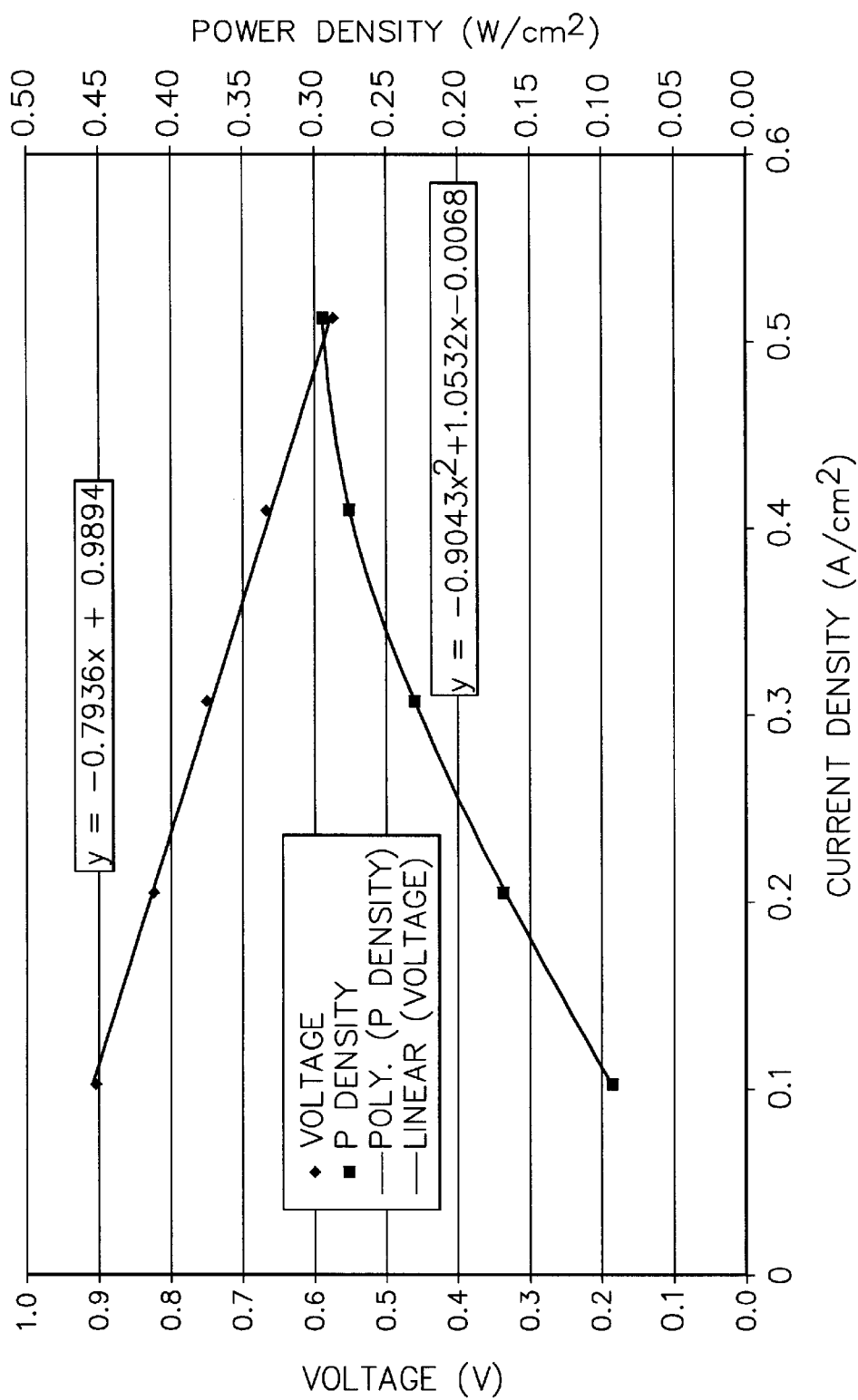
FIG. 6 is a graph which shows the polarization behavior of a fuel cell stack according to another embodiment of the present invention as plots of voltage, power density and fuel utilization versus current density.

The individual cell voltages under various current loads at start up were nearly equal, so the polarization behavior of Stack 12 was based on the arithmetic average of the three voltages, which is the same as the stack voltage divided by three. The polarization behavior of Stack 12 at four hours after the first application of current load is shown in FIG. 6. An estimate of the area specific resistance of Stack 12 is given by the slope of the least squares line and is equal to 0.7936 $\Omega \cdot cm^2$. The maximum power density for the stack of this example can be estimated from the regression equation for the power density and is 300 $mW/cm^2$.

As can be appreciated by those skilled in the art, the present invention provides for a radial flow fuel cell stack that minimizes the required sealing in terms of the number of interfaces to be sealed and the length of the interfaces. The minimization of the amount of required sealant is critical since these materials may have negative effects on the electrochemical performance of the stack. The fuel cell stack of the present invention also provides a more uniform flow field and, thereby, more uniform current density and temperature distributions. A more uniform temperature distribution leads to lower thermal stresses and, therefore, lower potential for catastrophic damage. Also provided by the present invention is ease of manifolding for co-flow and stack arrays in fuel cells having solid electrolytes. The use of annular ceramic cells in this design eliminates 90° corners where damaging stress concentrations can arise and lead to cell cracking.

Some additional advantages of the present design is the possibility of pre-assembling the stack groups of the stack components into subassemblies which can be tested for quality control. For example, the manifold 11, a set of manifold brackets 19, and the corresponding set of porous elements 20 can be brazed into a separate entity, which will be referred to as the composite manifold, that can be subjected to appropriate testing for qualification. Similarly, a cell 22 can be bonded to a seal bracket 28 and the resultant cell assembly can be subjected to appropriate testing. The interconnects 23 and a seal bracket 28 can be bonded the end plate 21 to form an interconnect end plate which can also be subjected to quality control. Two interconnects 23, one each for each principal surface of the separator plate 29, and a seal bracket 28 can be bonded to the separator plate 29 to form an interconnect assembly which can be subjected to quality control. The qualified subassemblies simplify the process of assembling a stack and increase the probability of having a good working stack. With the above subassemblies, the only seals which have to be made during the stack assembly process are those between each seal bracket 28 and the corresponding manifold bracket 19.

Stack assembly proceeds from the bottom up by laying up the bottom interconnect end plate about the bottom manifold bracket of the composite manifold and dispensing a glass or glass ceramic sealant at the interface between the seal bracket and the manifold bracket. This is then followed by laying up a cell assembly on top of the bottom interconnect end plate and dispensing a glass or glass ceramic sealant at the interface between the seal bracket and the manifold bracket. Next an interconnect assembly is laid up on the cell assembly and a glass or glass ceramic sealant is dispensed at the interface between the seal bracket and the manifold bracket. The alternate lay up of cell assemblies and interconnect assemblies is repeated as desired to build a stack with the last step being the placement of the top interconnect end plate on top of the topmost cell in the stack. The fuel stack proper is the set of cells and interconnect assemblies lying between the bottom and top interconnect end plates. Due to the use of glass or glass ceramic sealants at the seal bracket to the manifold bracket interfaces, the subassembly components of the stack of the present invention have some degree of movement relative to each other and relative to the composite manifold during the first firing and they therefore can conform to each other and lead to stack of low internal resistance.

It should be understood, of course, that the foregoing relates to preferred embodiments of the invention and that modifications may be made without departing from the spirit and scope of the invention as set forth in the following claims. Similarly, the various parts may called by different names without departing from the spirit and scope of the invention as set forth in the following claims.

We claim:

1. A fuel cell stack, comprising:
   an internal manifold having a first interior cavity and a second interior cavity;
   a plurality of single cells having an anode layer, a cathode layer, and an electrolyte layer therebetween, said single cells being disposed about said internal manifold;
   a manifold bracket that operatively fixes said manifold to at least one of said single cells, said manifold bracket describing a channel in communication with at least one of said first and second interior cavities;
   a porous element disposed in said channel; and
   a pair of end plates disposed on opposing sides of said cells.

2. The stack of claim 1, wherein said single cells comprise solid oxide fuel cells.

3. The stack of claim 1, wherein said single cells comprise proton exchange membrane fuel cells.

4. The stack of claim 1, wherein said single cells are planar and annular in configuration.

5. The stack of claim 1, wherein said manifold bracket is annular in configuration.

6. The stack of claim 1, further comprising a plurality of manifold brackets describing a plurality of channels in communication with at least one of said first and second interior cavities.

7. The stack of claim 1, further comprising a separator plate disposed between said single cells.

8. The stack of claim 1, further comprising a seal bracket fixed between said manifold bracket and one of said single cells.

9. A fuel cell stack, comprising:
   an internal manifold having a first interior cavity and a second interior cavity;
   a plurality of single cells having an anode layer, a cathode layer, and an electrolyte layer therebetween, said single cells being disposed about said internal manifold;
   a plurality of separator plates disposed among said single cells;
   a plurality of manifold brackets that operatively fix said manifold to at least one of said single cells and to at least one of said separator plates, said manifold brackets describing a plurality of channels in communication with said first and second interior cavities;
   a plurality of porous elements disposed in said channels; and
   a pair of end plates disposed on opposing sides of said separator plates.

10. The stack of claim 9, wherein said single cells are selected from the group consisting of solid oxide fuel cells and proton exchange membrane fuel cells.

11. The stack of claim 9, further comprising a plurality of interconnect elements disposed between said single cells and separator plates.

12. The stack of claim 11, wherein one of said interconnect elements is disposed immediately adjacent to one of said single cells and also wherein one of said separator plates is disposed immediately adjacent to said one of said interconnect elements.

13. The stack of claim 9, further comprising a plurality of passages disposed between said single cells and said manifold brackets.

14. The stack of claim 13, wherein said passages operatively communicate with said channels.

15. The stack of claim 9, wherein said first interior cavity receives an oxidant and said second interior cavity receives a fuel.

16. A fuel cell stack, comprising:
   an internal manifold having a first interior cavity and a second interior cavity;
   a plurality of single cells having an anode layer, a cathode layer, and an electrolyte layer therebetween, said single cells being disposed about said internal manifold;
   a plurality of separator plates disposed among said single cells;
   a plurality of interconnects disposed between said single cells and separator plates
   a plurality of manifold brackets fixed to said manifold;
   a plurality of seal brackets fixed between said manifold brackets and said single cells and separator plates;
   a plurality of first channels described by said manifold brackets, said first channels being in communication with said first interior cavity;
   a plurality of second channels described by said manifold brackets, said second channels being in communication with said second interior cavity; and
   a plurality of porous elements disposed in said first and second channels; and
   a pair of end plates disposed on opposing sides of said separator plates.

17. The stack of claim 16, wherein said single cells have a planar and annular configuration.

18. The stack of claim 16, wherein said separator plates have a planar and annular configuration, said plates being disposed about said internal manifold.

19. The stack of claim 16, wherein said manifold brackets have an annular configuration and are disposed about said internal manifold.

20. The stack of claim 16, wherein said porous elements have a cylindrical and annular configuration.

21. The stack of claim 16, further comprising a plurality of first and second passageways described by said seal brackets, single cells and separator plates.

22. The stack of claim 21, wherein said first passageways communicate with said first channels and said second passageways communicate with said second channels.

23. The stack of claim 21, wherein said first and second passageways are sealed from one another.

24. The stack of claim 16, wherein said first and second channels are sealed from one another.

25. The stack of claim 16, wherein said interconnect is made of metal foil in an off-set fin structure.

26. The stack of claim 16, wherein said interconnect is made of a porous metal.

27. The stack of claim 16, wherein said interconnect for an anode side of said cells is made of nickel foam.

* * * * *